United States Patent [19]

Bulgari

[11] Patent Number: 5,116,097
[45] Date of Patent: May 26, 1992

[54] MOTOR CAR WITH THREE FRONT SEATS SIDE BY SIDE

[75] Inventor: Gianni Bulgari, Roma, Italy

[73] Assignee: Gianni Bulgari S.p.A., Roma, Italy

[21] Appl. No.: 599,312

[22] Filed: Oct. 17, 1990

[30] Foreign Application Priority Data

Oct. 17, 1989 [IT] Italy .................. 67894 A/89

[51] Int. Cl.⁵ .................................. B60N 1/00
[52] U.S. Cl. .................................. 296/64; 297/232
[58] Field of Search ............ 296/63, 64; 297/232, 297/239

[56] References Cited

U.S. PATENT DOCUMENTS

| | | | |
|---|---|---|---|
| 1,039,780 | 10/1912 | Morgan | 296/64 |
| 1,078,602 | 11/1913 | Morgan | 296/64 |
| 2,647,791 | 8/1953 | Barenyi | 296/64 |
| 2,871,913 | 2/1959 | Appleton | 296/64 X |
| 3,050,333 | 8/1962 | Smith et al. | 296/64 |
| 3,243,221 | 3/1966 | Komenda | 296/64 X |
| 3,580,630 | 5/1971 | Fetter | 297/232 |
| 4,489,972 | 12/1984 | Monzini | 296/185 |

FOREIGN PATENT DOCUMENTS

| | | | |
|---|---|---|---|
| 284250 | 5/1913 | Fed. Rep. of Germany . | |
| 1281282 | 10/1968 | Fed. Rep. of Germany | 296/64 |
| 25935 | 2/1988 | Fed. Rep. of Germany | 296/64 |
| 1053218 | 7/1954 | France . | |
| 1059830 | 8/1954 | France . | |
| 728593 | 4/1955 | France | 296/64 |
| 1144964 | 10/1957 | France | 296/64 |
| 1543249 | 10/1968 | France | 296/64 |
| 53840B87 | 11/1987 | Italy . | |
| 14074 | of 1912 | United Kingdom . | |
| 24599 | of 1913 | United Kingdom . | |

Primary Examiner—Johnny D. Cherry
Assistant Examiner—Joseph D. Pape
Attorney, Agent, or Firm—Sughrue, Mion, Zinn, Macpeak & Seas

[57] ABSTRACT

In a motor car of the type with three front seats side by side the central front seat is set further back than the other two front seats in order to provide adequate lateral restraint for the occupant of that seat when travelling. The passenger compartment of the car also has two separate rear seats whose median planes are slightly inclined to the vertical median plane of the car so that they diverge forwardly. The rear seats are spaced apart so as to leave space between them which is partially occupied by the central front seat. Maximum comfort and a large amount of available space are thus afforded for all five passengers, while the body can have quite small external dimensions. Preferably, the rear seats can be folded down in order to provide a large loading surface accessible through the rear hatch of the car.

3 Claims, 5 Drawing Sheets

MOTOR CAR WITH THREE FRONT SEATS SIDE BY SIDE

FIELD OF THE INVENTION

The present invention relates to motor cars of the type with three front seats side by side.

BACKGROUND OF THE INVENTION

Various cars of this type have been proposed in the prior art. The idea behind the third front seat is to enable two non-drivers to be accommodated in the front part of the passenger compartment, when the car is occupied by only three people, so as to afford them the maximum comfort, the maximum available space, and the maximum visibility. Not least is the need to facilitate communication between the third passenger and the other two, which is somewhat hampered in conventional vehicles where the third passenger sits on the rear seat.

In spite of the advantages indicated above, cars with three front seats produced up to now have never been very successful commercially. The Applicant considers that one of the main reasons for this lack of success is the fact that the passenger sitting on the central front seat does not have lateral supports available for use when travelling, and therefore feels particularly uncomfortable on bends and at sustained speeds.

In order to resolve the aforesaid problem, the Applicant has already proposed, in his Utility Model application Ser. No. 53840-B/87 of 26th Nov. 1987, a car with three front seats side by side, in which the central front seat is set slightly further back than the other two front seats. The person occupying the central front seat is thus restrained laterally when travelling by the two adjacent sides of the two lateral front seats. At the same time, all the above-mentioned advantages resulting from the use of three front seats side by side are achieved.

Since filing his previous application Ser. No. 53840-B/87, however, the Applicant has become aware that cars with three front seats side by side, in which the central front seat is set slightly further back than the other two front seats, had already been proposed in the art. Cars of this type are described and illustrated, for example, in British Patents Nos. 14074 and 24599, in German Patent No. 284 250, and in French Patents Nos. 1,053,218 and 1,059,830. However, these prior solutions relate to motor cars without rear seats, or to cars in which the accommodation of the passengers occupying the rear seats is unsatisfactory. The use of a front seat which is set back in fact decreases the space available for the rear passengers in a passenger compartment of given dimensions. This prevents the use of a single bench seat in the rear, for example, since the person occupying the central part of the bench has very little space available for his legs because of the fact that the central front seat is set back. In some of the prior documents cited above (including the Applicant's Utility Model Application) this problem is solved by the provision of a row of three seats side by side in the rear, also with the central seat set slightly further back. However, this solution is not completely satisfactory since it involves an increase in the overall length of the car and/or a decrease in the space available in the rear load compartment.

SUMMARY OF THE INVENTION

The object of the present invention is to provide a motor car which combines all the characteristic advantages of the various solutions proposed previously without having their disadvantages.

In order to achieve this object, the subject of the invention is a motor car with three front seats side by side, characterised by the combination of the following characteristics:

a) the central front seat is set slightly further back than the other two front seats so as to provide the correct lateral restraint for the person occupying the seat when the car is moving, b) the car has two separate rear seats whose vertical median planes are inclined to the longitudinal median plane of the motor vehicle so that they diverge forwardly, the space between the two rear seats being partially occupied by the central front seat.

The divergence of the two rear seats towards the front provides the optimum travelling comfort for the people occupying these seats in spite of the fact that the central front seat is set back, and at the same time enables the motor car to have quite small external dimensions (this relates particularly to the length and the width of the car at the rear) whilst ample space is available in the load compartment. The elimination of the third rear seat might, at first sight, appear to be a disadvantage. In fact, the basic error of the solutions proposed previously consists of the fact that the third front seat was considered as a supplementary seat additional to the five seats normally present. This led to the problem that the car was too bulky externally. One of the ideas upon which the present invention is based, is that of retaining a five-seat passenger compartment and simply transferring the central rear seat to the front part of the passenger compartment. Once this simple, but not obvious, idea has been considered (all in all, the frequency of journeys with six people in a vehicle is not such as to justify the provision of the sixth seat with all the resultant problems) it can be appreciated fully that the invention defined above actually provides the best compromise between the various requirements which come to play.

The two rear seats are preferably of the type which can be folded down so as to increase the space available in the load compartment. In this case, the motor car has a rear hatch for access to the load compartment.

BRIEF DESCRIPTION OF THE DRAWINGS

Further characteristics and advantages of the invention will become clear from the description which follows with reference to the appended drawings, provided by way of non-limiting example, in which.

DETAILED DESCRIPTION OF THE PREFERRED EMBODIMENT OF THE INVENTION

Figure 1:
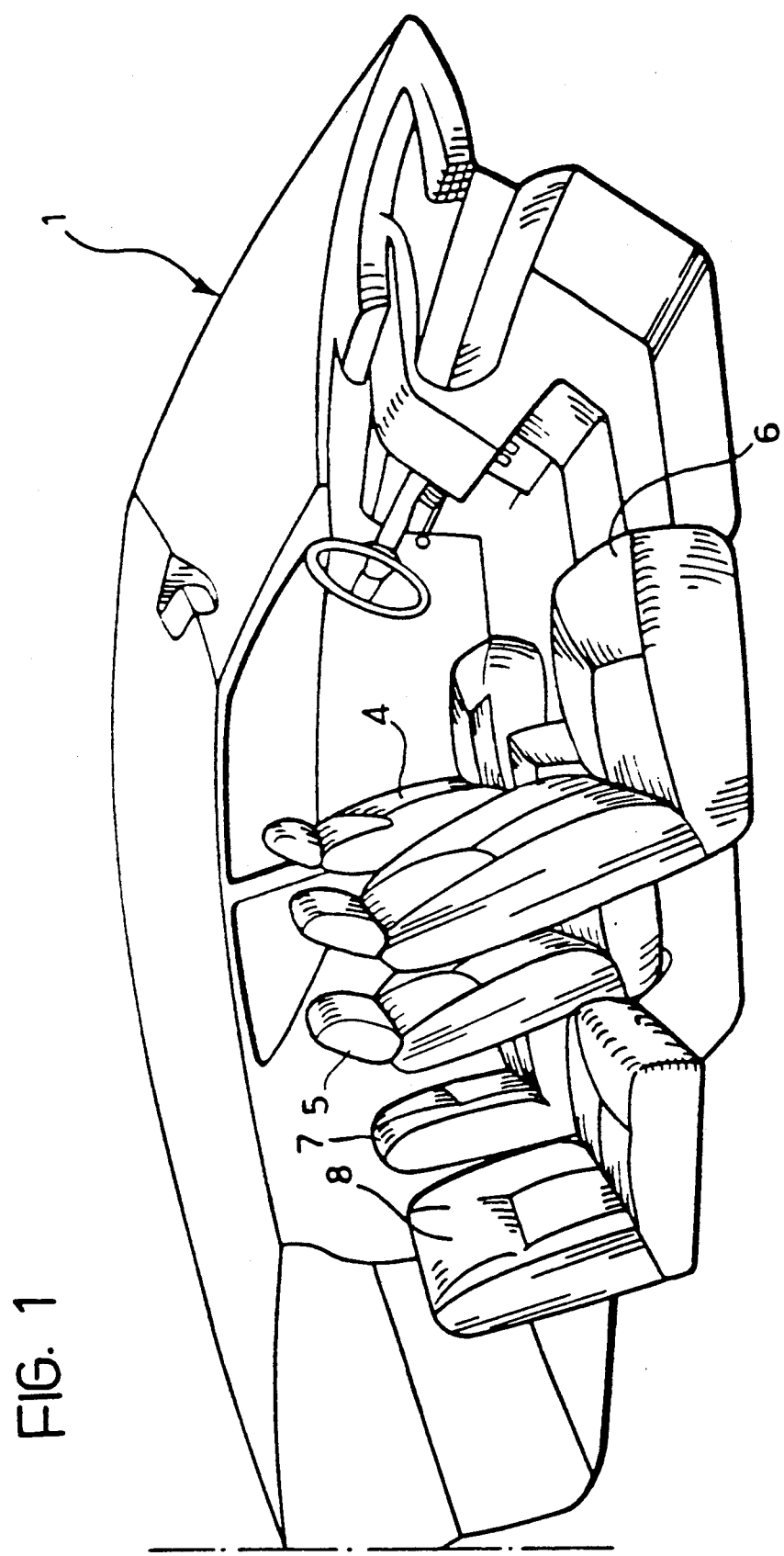
FIG. 1 is a perspective view of the passenger compartment of a motor car according to the invention.
Figure 2:
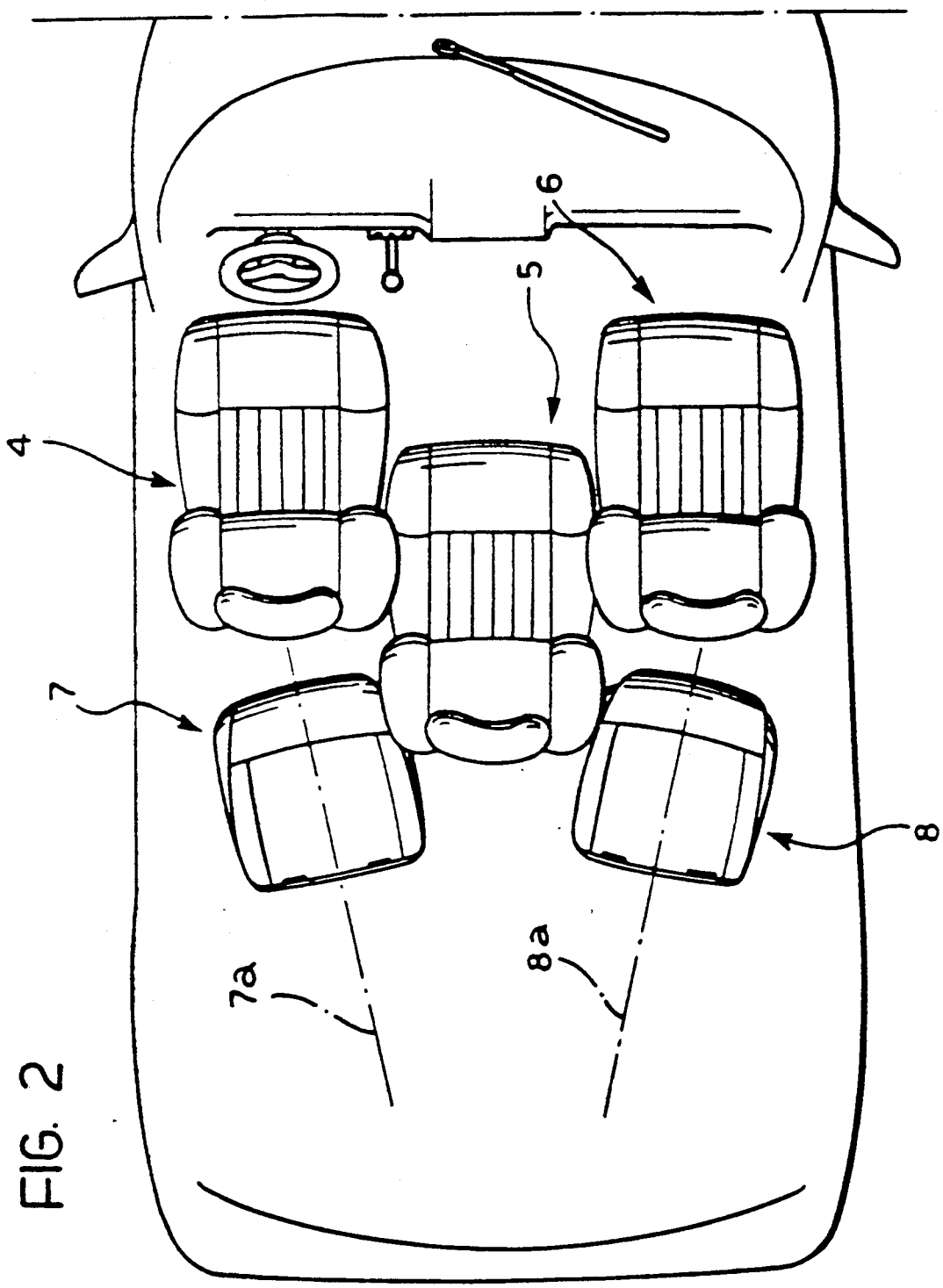
FIG. 2 is a schematic plan view of the passenger compartment of FIG. 1 with the rear seats in an inoperative position.

With reference to the drawings, a car is indicated 1 and has three front seats 4, 5, 6 side by side. The central front seat 5 is set slightly further back than the two lateral front seats 4, 6 so as to enable its occupant, as stated, to be supported laterally by the adjacent sides of the lateral front seats 4, 6. This provides maximum travelling comfort, particularly on bends. Preferably, the central front seat 5, like the lateral front seats 4, 6, is mounted on longitudinal guide devices which enable the longitudinal position of the seat to be adjusted relative to the floor of the car.

The advantages resulting from the described arrangement of the seats 4, 5, 6 are stated fully in the introduction of the present description.

At the rear, the passenger compartment of the car has two separate rear seats 7, 8 whose vertical median planes 7a, 8a are inclined (by 9° in the embodiment illustrated) to the longitudinal vertical plane 9 of the motor vehicle so that they diverge forwardly. As already mentioned above, this affords the maximum comfort for the passengers occupying these seats. At the same time, the space between the two seats 7, 8 is partially occupied by the central front seat 5 but this does not involve the production of a car which is too long. On the contrary, this arrangement enables the external dimensions of the car to be quite small. Moreover, the inclination of the seats also enables the width of the rear part of the body to be limited.

The rear seats 7, 8 may be of the type which can be folded down so as to provide a large load compartment accessible through the rear hatch of the car.

Figure 3:
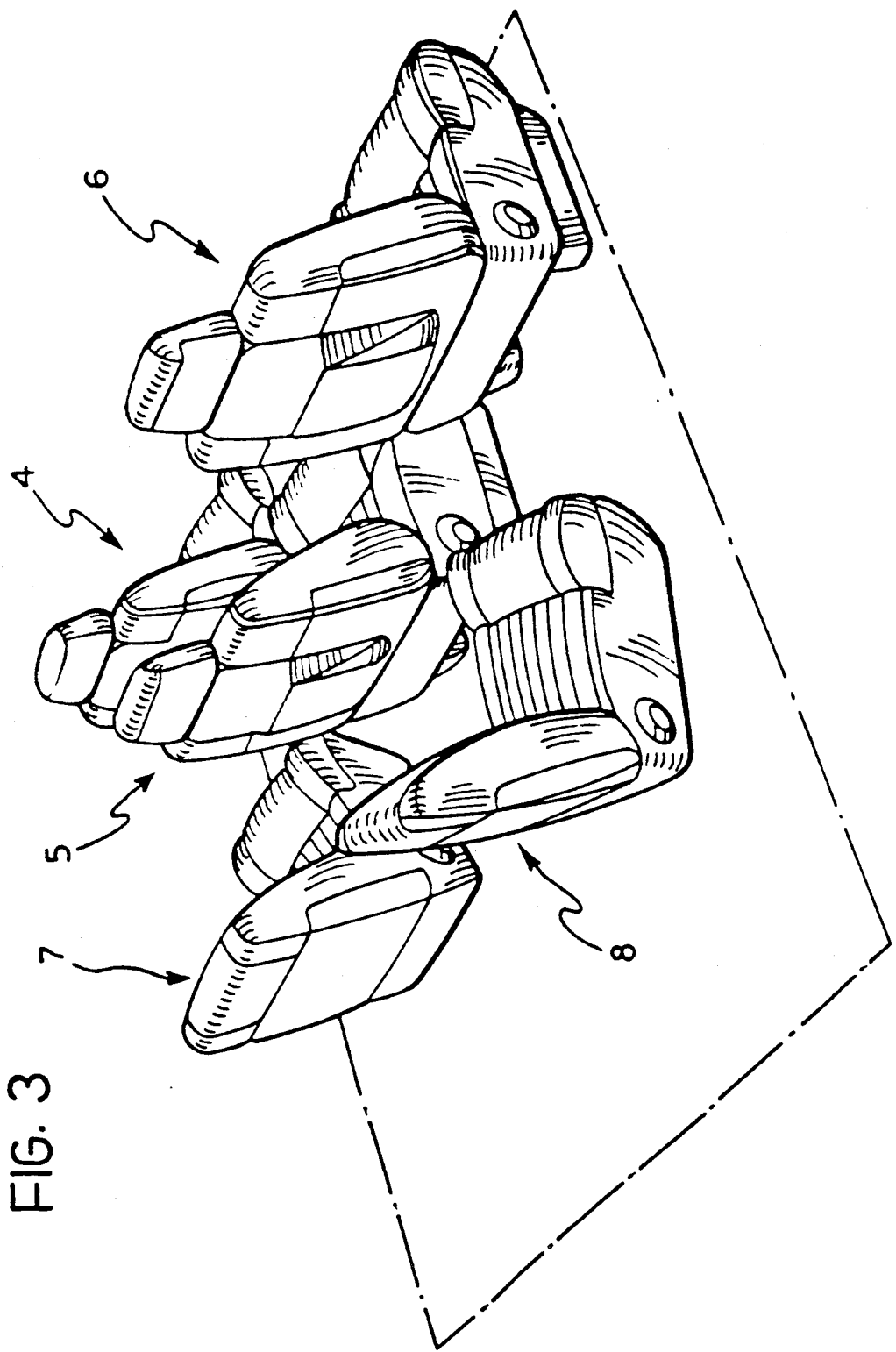
FIG. 3 is a further perspective view of the five seats.
Figure 4:
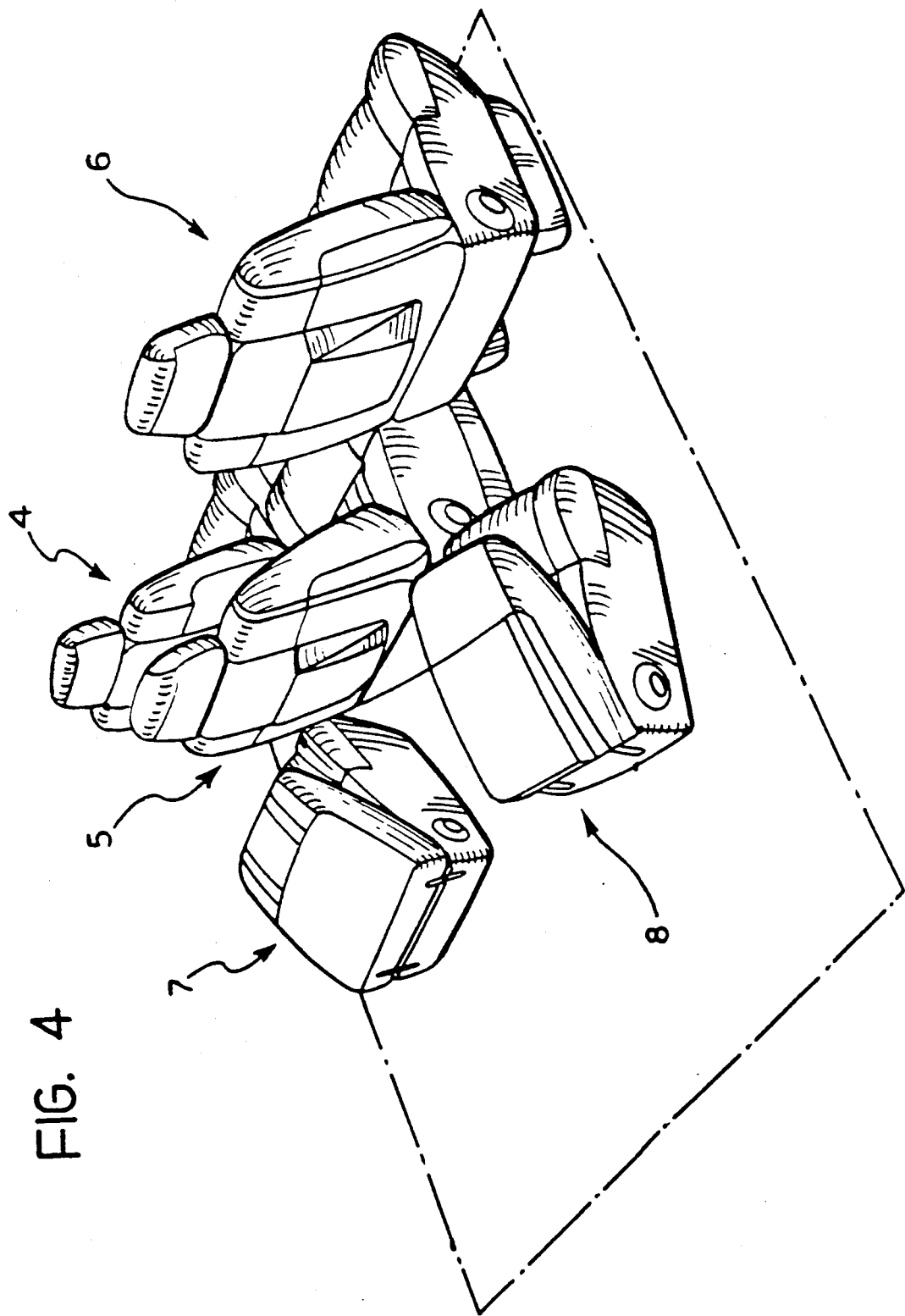
FIG. 4 shows the way in which the rear seats can be moved to the inoperative position.
Figure 5:
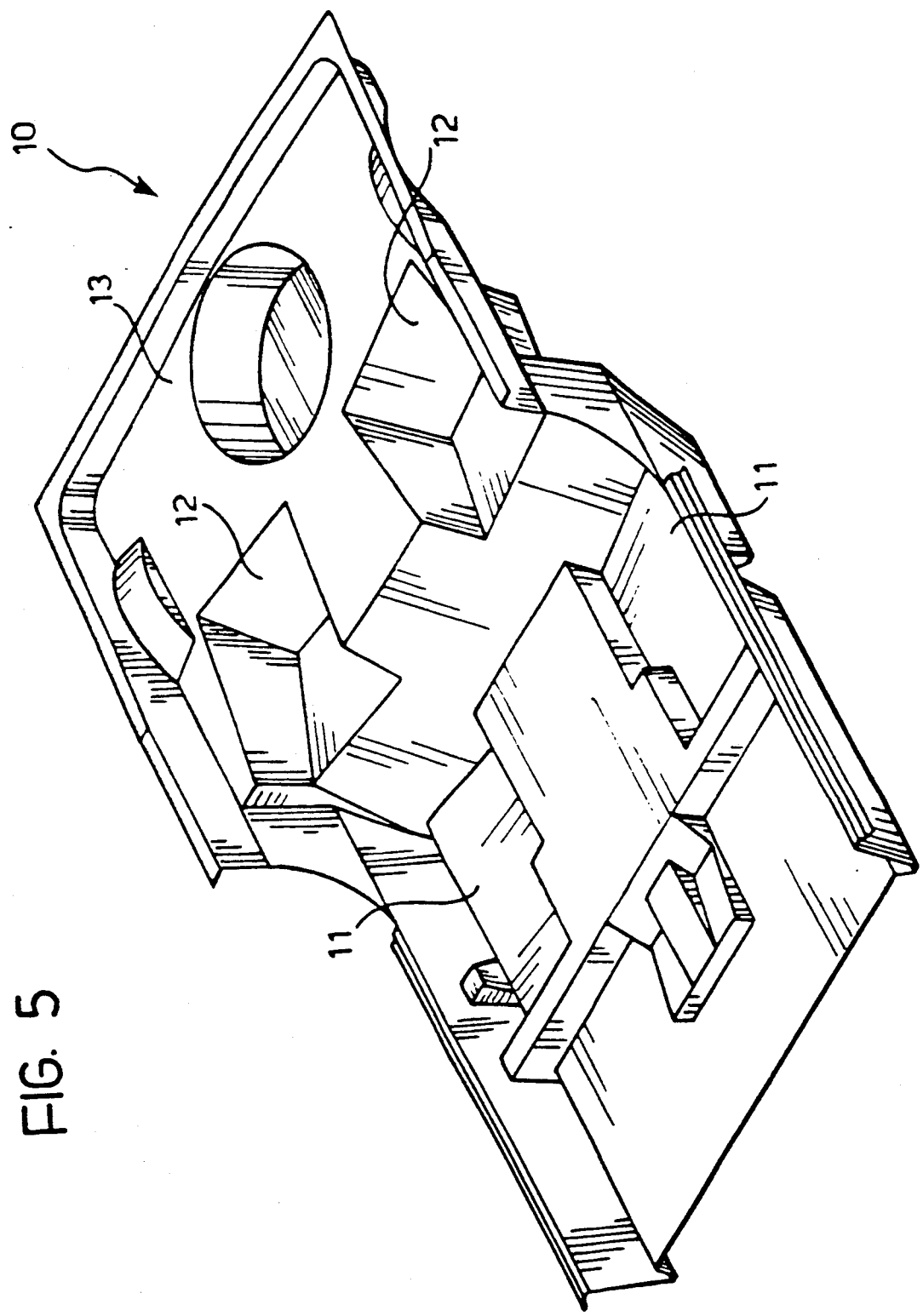
FIG. 5 is a perspective drawing of the floor of the car.

According to a possible solution, the seats 7, 8 may be moved from the operative position (FIG. 3) to the inoperative position (FIG. 4) by the folding down of the backrests. FIG. 5 shows the floor 10 of the car (in the embodiment illustrated this is a floor of plastics material for mounting on a chassis frame) including seatings 11 for the front seats and raised seatings 12 for the rear seats. When the backrests of the rear seats are folded down to the position shown in FIG. 4, they are flush with the rear loading surface 13 so as to extend its useful area.

The adoption of the solution of the present application provides a car with characteristics of considerable originality compared with cars proposed hitherto. All the passengers are provided with accommodation and comfort at the level of a large, high-class car, whilst the actual external dimensions of the car can be very small so that the invention can also be used for a medium or low-class car. Moreover, the car is suitable for production on the basis of different possible "philosophies" of use. In fact, it lends itself to production in the form of a "family" car with a large load space, in the form of a "city" car which has small dimensions but is nonetheless spacious, or even in the form of a coupe with ample accommodation for five people.

Naturally, the principle of the invention remaining the same, the forms of embodiment and details of construction may be varied widely with respect to those described and illustrated, without thereby departing from the scope of the present invention.

What is claimed is:

1. A five-seat motor car having a longitudinal axis extending front to aft, comprising:
   a passenger compartment with a front and a rear row of seats, wherein the front row of seats includes a central front seat and two side front seats, one of said two side front seats being a driving seat, said central front seat being slightly displaced rearwardly with respect to said two side front seats so that a person occupying said central front seat is laterally supported by adjacent sides of said two side front seats, and
   wherein said rear row of seats includes only two separate rear seats which are laterally spaced apart from each other and have respective longitudinal axes which are rotated with respect to the longitudinal axis of the motorcar so that they diverge forwardly, the space immediately laterally between said two rear seats being partially occupied by said central front seat.

2. A motor car according to claim 1, wherein the rear seats are of the type which can be folded down.

3. A motor car according to claim 1, wherein the central front seat is adjustable along said longitudinal axis of said motor car.

* * * * *